Nov. 26, 1929.  J. KÖHLEN  1,736,922
FLUSHING DEVICE FOR ROCK DRILLS
Filed Feb. 11, 1928
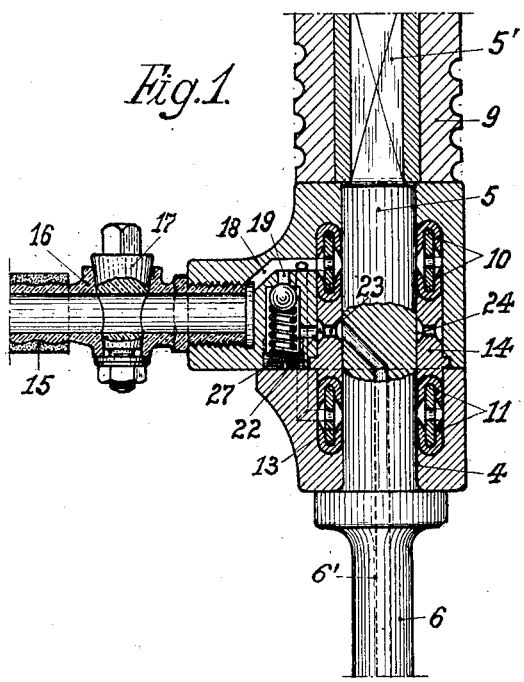
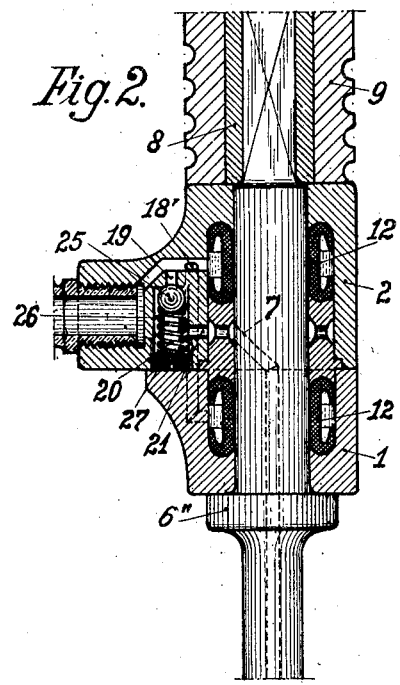
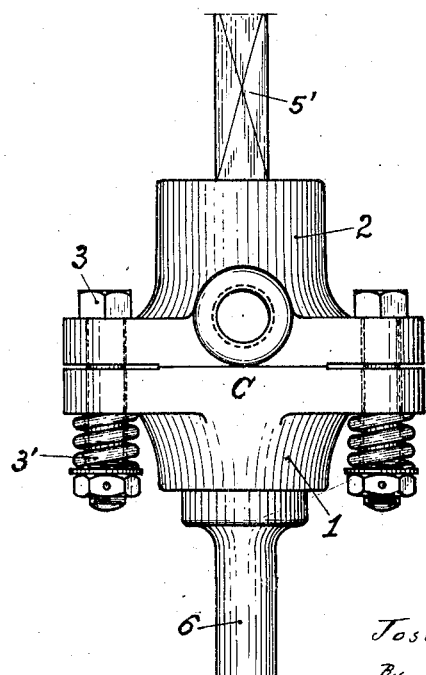
Inventor:
Josef Köhlen
By  
Attorney.

Patented Nov. 26, 1929

1,736,922

UNITED STATES PATENT OFFICE

JOSEF KÖHLEN, OF HERNE IN WESTPHALIA, GERMANY

FLUSHING DEVICE FOR ROCK DRILLS

Application filed February 11, 1928, Serial No. 253,774, and in Germany February 11, 1927.

In connection with rock-drills it has now become a common practice to flush the bore-hole with water to prevent the dispersal of the dust created during the drilling process which is injurious to the health of the workmen. Besides this the use of water instead of compressed air has the advantage that in many cases it acts as a lubricant and thus increases the rate of work. This is of considerable importance when vertical bore-holes have to be sunk to greater depths, as for instance up to 12 feet in wet rock and to about 35 feet and more in dry rock. To flush or scavenge such holes the tubular drill is usually connected by means of a flushing-device to a suitable water conduit, such as a water-pipe, a hose, a flexible tube and the like. Devices of this kind are usually seated on the shank of the drill to conveniently lead the water into the longitudinal bore of the drill and thence to the cutting edges thereof and to the bottom of the bore-hole. To accomplish this in a satisfactory manner a leakage between such device and the drill-shank must be prevented. To this end, generally, leather washers pressed together by springs were employed, but such packing wears out in a comparatively short time, because the holes in said washers are rapidly enlarged by the rotating drill which is aided therein by the inelasticity of such washers in a radial direction, for which reasons it was almost impossible to obtain and retain a tight packing. Leakages once started enlarged very rapidly to such an extent that the water squirted out freely, whereby the workmen were much molested. To avoid this, devices for supplying flushing-water were suggested wherein the pressure of the latter is utilized for tightening up cup-shaped hydraulic packings made of leather, rubber and the like, so that in a certain sense the flushing-water introduced into such flushing-devices is divided into two branches, of which one proceeds to the packing for tightening the same and the other is directed through the longitudinal bore of the drill to the bottom of the bore-hole.

But by the aid of this arrangement the water does normally not exert a sufficiently strong pressure on the packing to form a tight joint, unless some special means are employed or the drill operates in an exceptionally deep hole. This is based on the fact that the resistance offered to the flushing-water while it flows from the main valve of the water-conduit through the flushing-device and the tubular drill to the bottom of the bore-hole and back again to the mouth of the bore-hole, is insufficient in holes of shallow or intermediate depths to form a pressure adapted to assure an absolutely tight joint. This disadvantage can however be obviated to some extent by the use of an exceptionally large volume of flushing-water, but such mode of operation would, for economical reasons, and, on account of the inconvenience such great volume of water would cause to the workmen on its escape from the bore-hole, be of little or no practical value.

In order to apply such hydraulic packings with advantage at all I provide a flushing-device equipped with regulating means adapted to regulate at will the volume and the pressure of that part of the flushing-water destined to act upon the packing.

I prefer to employ for the execution of this task a ball-valve controlled by a regulatable spring adjustable to any desirable degree of exactness. This ball-valve I arrange in the passage by which the flushing-water is directed to the bottom of the bore-hole in order to throttle the cross-sectional area of this passage to form a resistance the magnitude of which simultaneously determines the pressure of that branch of the flushing-water which acts upon the packing. To obtain this pressure the ball-valve must be suitably adjusted. In this manner it is made possible to keep the packing always under a water-pressure sufficiently high to insure its tightness and at the same time keep the volume of the flushing-water directed to the bottom of the bore-hole sufficiently large to answer all demands at any stage of the drilling-operation.

By means of the wide range of adjustability obtained by said ball-valve in conjunction with the main valve provided for the regulation of the volume of flushing-water introduced into this improved flushing-device it is made possible to meet not only all difficulties which may arise during the time a deep hole is brought down but also to always find the correct proportion between the pressure exerted by the flushing-water on the packing and the pressure and the volume of the flushing-water which passes through said ball-valve and the tubular drill to the bottom of the bore-hole.

In the accompanying drawing my present invention is illustrated by way of example, wherein:

Figure 1 is a longitudinal sectional view of the lower end of a rock-drill and of the improved flushing-device combined therewith, Figure 2 is a similar section of a modification of the improved flushing-device, and Figure 3 is an elevation of the flushing-device seen at right angles to Figures 1 and 2.

The casing C of the improved flushing-device consists of a bottom part 1 and a top part 2 resiliently connected by means of bolts 3 and springs 3″ interposed between the lower part 1 of the casing and the nuts of said bolts. This casing is rotatably mounted on a cylindrical seat 4 formed by an enlarged member of the shank 5 of a tubular drill 6 the longitudinal bore 6′ of which is always in communication with the cylindrical face of the seat 4 by means of an inclined radial duct 7. The squared end 5′ of the drill-shank is fitted in the usual manner into a sleeve 8 arranged in the lower end of the rock-drill casing 9. To retain said flushing-device during the drill-operation in place, a spring (not shown) of any suitable configuration is screwed over the lower end of said rock-drill casing and grasps with its lower end beneath the annular shoulder 6″ of the drill. As shown in Figure 1 and 2 the parts 1 and 2 of the casing C are, adjacent to the cylindrical seat 4, recessed for the reception of a packing which in Figure 1 is composed of two groups of cup-shaped packing-rings 10 and 11 arranged in pairs and made of leather or of any other suitable material, whereas in Figure 2 only two single packing rings 12 are employed the edges of which are U-shaped and connected by a stout intermediate member which serves the same purpose as the perforated stay-ring 13 in Figure 1, namely to keep the packing-rings always in readiness for instataneous action. The packing rings 12 are preferably made of rubber which material is adapted to produce packing-rings of this cross-section without difficulties and under exclusion of auxiliary means. In both instances the packing-rings are kept apart by a distance-ring 14 of a size to hold said packing-rings in close contact with the shoulders of the casing members 1 and 2 and the channelled edges of the distance-ring 14.

The flushing-fluid, for obvious reasons generally water, is introduced into the top part 2 of the casing C by means of a suitable conduit, as for instance a water-pipe, a hose or a flexible tube. In Figure 1 this conduit is presumed to be a hose 15 connected with said top part 2 by the aid of the casing 16 of a regulatable valve 17. After the flushing-fluid has entered the casing C a part of it is guided by a branched passage 18, 18′ simultaneously to the two groups of packing-rings 10 and 11 shown in Figure 1, or to the separately arranged packing-rings 12 shown in Figure 2. The remaining part of the flushing-fluid passes from the passage 18 by way of an inlet-duct 19 to a tubular recess 20 arranged in the top part 2 of the casing C and connected by a lateral outlet-duct 21 to an external annular groove 22 of the distance-ring 14 which groove is connected by radial ducts 23 to an internal groove 24 of the same ring 14. This last named groove is always in communication with the external end of the inclined radial duct 7, so that the flushing-fluid which enters the inlet duct 19 can successively pass through the recess 20, the outlet-duct 21, the radial ducts 23, the inclined radial duct 7 to the longitudinal bore 6′ of the drill 6 and thence to the bottom of the bore-hole. To control the flow of the flushing-fluid through this channel or passage a regulatable ball-valve 25 is arranged in said tubular recess 20 and normally pressed against the inner end of said inlet-duct 19 by a spring 26 the resistance of which can be regulated by a screw-plug 27 adapted to be screwed into said recess from beneath.

Since Figure 1 only differs from Figure 2 in respect to the packing-rings, the numbers of reference appertaining to the parts of the device common to both embodiments of my invention are for the sake of clearness inserted at random in both figures.

My improved flushing-device operates as follows:—

After the rock-drill has been started the valve 17 is opened to let the flushing-fluid enter under pressure into the casing C wherein it immediately fills the branched passage 18, 18′ and the spaces left by the packing-rings in the annular recess of the casing C. Hereby the packing-rings 10 and 11, and 12 respectively, are expanded to encircle the cylindrical seat 4 with sufficient pressure to form hereon two tight joints, of which one is arranged above and the other below the mouth of said inclined radial duct 7. The pressure now gradually rises in said branched passage until it reaches a predetermined height, for instance 2 to 2,5 atmospheres. At this pressure—which, of course, may vary since this only depends on the regulated resistance of the spring 26—the ball-valve 25 leaves its seat and admits the flushing-fluid to flow through the tubular recess, duct 21, distance-ring 14, inclined radial duct 7, and longitudinal bore 6' to the bottom of the bore-hole to remove from the latter dust and débris. It is clear that the resistance of the spring 26 has to be regulated with a view to let the pressure of the flushing-fluid contained in the branched passage 18, 18' not reach a point much in excess of the pressure actually required to avoid leakages in the packing, since otherwise the packing-rings will be needlessly worn by excessive friction, which in turn tends to lessen the working capacity of the rock-drill, because the angular drill-steps are shortened.

The cooperation of the ball-valve 25 with the regulatable valve 17, which controls the admission of the flushing-liquid into the casing C, suffices for a simple regulation of the action of the flushing-device. When, however, the adjustment of both valves is such, that for bore-holes up to a certain maximal depth a certain volume of flushing-fluid will reach the bottom of the bore-hole, and then the bore-hole is sunk beyond this maximal depth and on this account a greater quantity of the flushing-fluid is required, it would be most disadvantageous to accomplish this by a simple reduction of the tension of the spring 26, or in other words, to try to attain this end by a simple increase of the cross-sectional area of the passage controlled by the ball-valve 25, because a regulation of this kind would simultaneously reduce the pressure of the flushing-fluid which acts upon the packing. In order to keep this pressure practically constant to assure at all times a tight packing it is advisable to obtain the desired new adjustment of the flushing-device by the cooperative actions of the valves 17 and 25, for which reason both valves should be adjusted simultaneously, since only in this manner it is possible to vary the pressures of both branches of the flushing-fluid independently of each other.

I claim:—

1. A flushing-device for rock-drills comprising in combination, a tubular drill having a cylindrical seat, a casing rotatably mounted on said seat, a packing encircling said cylindrical seat within said casing, means for introducing a flushing-fluid into said casing, a passage for directing the fluid to the bottom of the bore-hole, and a spring-controlled check valve arranged in said passage and adapted to regulate the fluid-pressure acting on said packing.

2. A flushing device for rock-drills comprising in combination, a tubular drill provided with a shank having a cylindrical seat communicating by a duct with the longitudinal bore of the drill, a casing rotatably mounted on said cylindrical seat and provided with a recess, groups of packing-rings arranged in said recess, a radially perforated distance-ring arranged between said groups of packing-rings, a conduit for supplying flushing-fluid, adjustable valve means in said conduit for regulating the supply of fluid therethrough, a branched passage in said casing for leading a part of said fluid from the conduit to said groups of packing-rings for tightening the same, a recess in said casing communicating at one end with said branched passage and at the other end with the radial perforations of said distance-ring, and a regulatable ball-valve adapted to regulate the volume and the pressure of the flushing-fluid directed to the bottom of the bore-hole and in conjunction therewith the fluid-pressure acting on the packing.

3. A flushing-device for rock-drills comprising in combination, a tubular drill provided with a shank having a cylindrical seat communicating by a radial duct with the longitudinal bore of the drill, a subdivided casing rotatably mounted on said cylindrical seat and recessed adjacent to said seat, groups of packing-rings arranged in said recess and each composed of two packing-rings held apart by a perforated stay-ring, a distance-ring arranged between said groups of packing-rings and provided with internal and external grooves connected by radial ducts, a conduit, adjusting means in said conduit for regulating the volume of the flushing-fluid introduced into said casing, a branched passage in said casing for leading a part of said fluid to each group of said packing-rings for tightening the same, a tubular recess in said casing communicating with said branched passage by an inlet-duct and with the external groove of the distance-ring by an outlet-duct, a ball-valve in said tubular recess, a spring normally pressing said ball-valve against said inlet-duct, and adjusting means in said tubular recess for adjusting the resistance of said spring to adapt said ball-valve to regulate the volume and the pressure of the flushing-fluid directed to the bottom of the bore-hole and in conjunction therewith the fluid-pressure acting on the packing.

4. A flushing-device for rock-drills comprising in combination, a tubular drill provided with a shank having a cylindrical seat communicating by a radial duct with the longitudinal bore of the drill, a subdivided casing rotatably mounted on said cylindrical seat and recessed adjacent to said seat, packing-rings seated in said recess, a longitudinally grooved and radially perforated distance-ring arranged between said packing-rings to keep them apart, a valve controlling the volume and the pressure of the flushing-fluid admitted into said casing, a flexible conduit connected with said valve, a branched passage in said casing for leading a part of said fluid to said packing-rings for tightening the same, a tubular recess in said casing communicating by an inlet duct with said branched passage and by an outlet-duct with the radial perforations of said distance-ring, a ball-valve in said tubular recess, a spring supporting said ball-valve, and a screw-plug arranged in said tubular recess for varying the resistance of said spring to adapt said ball-valve to regulate the volume and the pressure of the flushing fluid directed to the bottom of the bore-hole and in conjunction therewith the fluid-pressure acting on the packing.

5. A flushing-device for rock-drills comprising in combination, a tubular drill provided with a shank having a cylindrical seat communicating by a radial duct with the longitudinal bore of said drill, a horizontally subdivided cup shaped casing rotatably mounted on said cylindrical seat and recessed adjacent to said seat, means for coupling the separate parts of said cup shaped casing, packing-rings arranged in said recess, a longitudinally grooved and radially perforated distance-ring placed between said packing-rings, a flexible conduit for introducing a flushing-fluid into said casing, an adjustable valve connecting said conduit with said casing and adapted to regulate the volume and the pressure of the admitted flushing-fluid, a branched passage leading a part of said fluid to said cup-shaped packing-rings, a tubular recess in said casing connected with said branched passage by an inlet-duct and with said radially perforated distance-ring by a lateral outlet-duct, a regulatable ball-valve in said tubular recess adapted to regulate the volume and the pressure of the flushing-fluid directed to the bottom of the bore-hole and in conjunction therewith the fluid pressure acting upon the packing.

6. A flushing-device for rock-drills comprising in combination, a tubular drill provided with a shank having a cylindrical seat comunicating by a radial duct with the longitudinal bore of said drill, a horizontally subdivided casing rotatably mounted on said cylindrical seat between a shoulder of said drill and the squared shank-end and provided with an annular recess between its ends, means for resiliently coupling said parts of the casing, packing-rings arranged in said annular recess, a longitudinally grooved and radially perforated distance-ring keeping the parts of said casing in alignment and said packing-rings apart, a conduit for admitting a flushing-fluid into said casing, an adjustable valve adapted to connect said conduit with said casing and to regulate the volume and the pressure of the fluid admitted into said casing, a branched passage for leading a part of the fluid to said packing-rings to tighten the same, a tubular recess in said casing communicating by an inlet-duct with said branched passage and by an outlet-duct through said radially perforated distance-ring with the longitudinal bore of said drill, and a regulatable ball-valve in said recess adapted to regulate the volume and the pressure of the flushing-fluid directed to the bottom of the bore-hole and in conjunction therewith the fluid-pressure acting upon said packing independently of the adjustable valve of said conduit.

7. In a flushing-device for rock-drills the combination of a tubular-drill having a cylindrical seat, a casing rotatably mounted on said seat, a packing arranged between said seat and said casing, a conduit for leading a flushing-fluid into said casing, an adjustable valve connecting said fluid-conduit with said casing and adapted to regulate the pressure of the fluid flowing to said packing for tightening the same, a passage directing the fluid to said tubular drill, and a regulatable ball-valve arranged in said passage and adapted to regulate the pressure of the fluid directed to said tubular drill independently of the fluid-pressure acting upon said packing.

In testimony wherof I affix my signature.

JOSEF KÖHLEN.